United States Patent [19]
Kolin

[11] 3,734,083
[45] May 22, 1973

[54] ELECTROMAGNETIC CATHETER VELOMETER - FLOW METER

[75] Inventor: Alexander Kolin, Bel Air, Calif.

[73] Assignee: The Regents of the University of California, Berkeley, Calif.

[22] Filed: Sept. 22, 1970

[21] Appl. No.: 74,436

[52] U.S. Cl.........128/2.05 F, 73/194 EM, 128/349 R
[51] Int. Cl. ............................................A61b 5/02
[58] Field of Search................128/2.05 F, 2.05 R, 128/2 A, 2.1 R, 345, 349; 73/194 EM

[56] References Cited

UNITED STATES PATENTS

| | | | |
|---|---|---|---|
| 3,516,399 | 6/1970 | Barefoot | 128/2.05 F |
| 3,620,207 | 11/1971 | Sinclair | 128/2.05 F |
| 3,529,591 | 9/1970 | Schuette | 128/2.05 F |
| 3,397,699 | 8/1968 | Kohl | 128/349 R |
| 3,241,554 | 3/1966 | Coanda | 128/345 X |
| 3,545,428 | 12/1970 | Webster, Jr. | 128/2.05 F |
| 3,330,269 | 7/1967 | Pieper | 128/2.05 F |

OTHER PUBLICATIONS

Pieper, H. P., Review of Scientific Instruments, Vol. 29, No. 11, Nov. 1958, pp. 965-967.
Blood Flow Transducers, Biotronex Laboratories Catalogue, Jan. 1969, pp. 1-4.
Physiology, Vol. 59, 1968, pp. 808-815.
U.S.C.I. Catalogue, 1967, p. 33.
New Scientist, July 13, 1967, pp. 72-74.

Primary Examiner—Kyle L. Howell
Attorney—Jessup & Beecher

[57] ABSTRACT

A catheter is provided in the form of an open ended flexible tube, the tube having an intermediate slitted portion. Each of the two sections of the tube adjacent the slitted portion is shaped outwardly into an arched configuration. A pair of electrodes are mounted in the interior of the portion of the tube between the slitted portion and the open end. A slidable plunger may be mounted in the tube, and which can be moved into position to prevent fluid flow through the tube.

12 Claims, 3 Drawing Figures

PATENTED MAY 22 1973 3,734,083
FIG. 1.
FIG. 2.
FIG. 3.
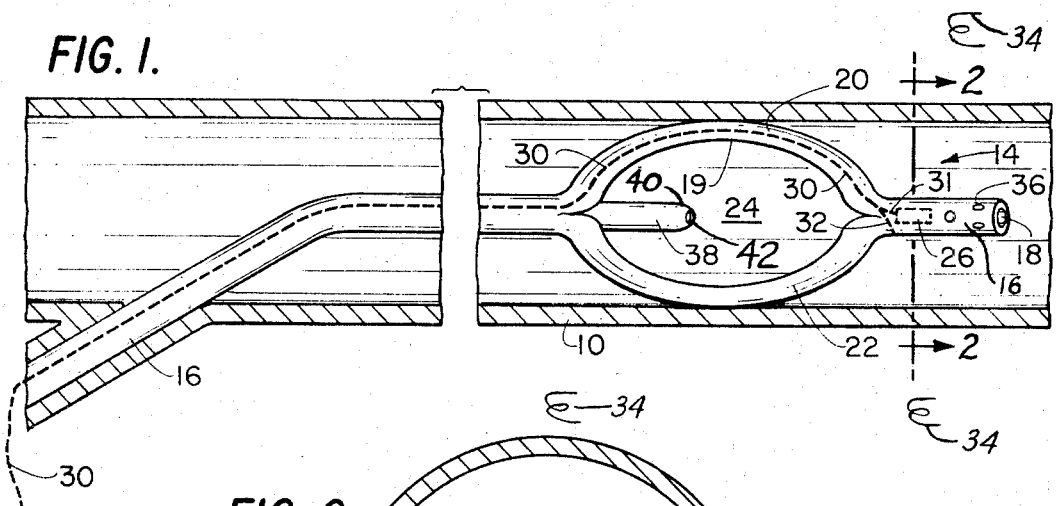
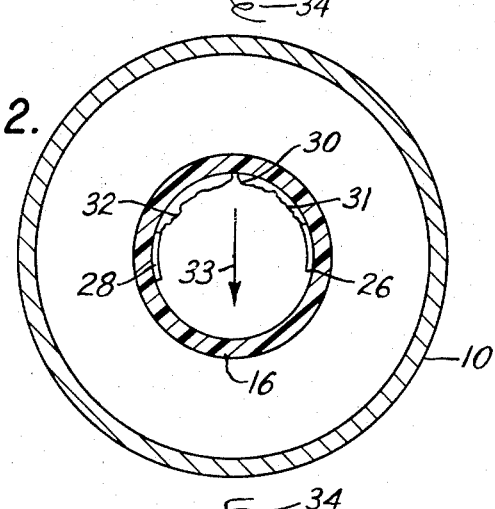
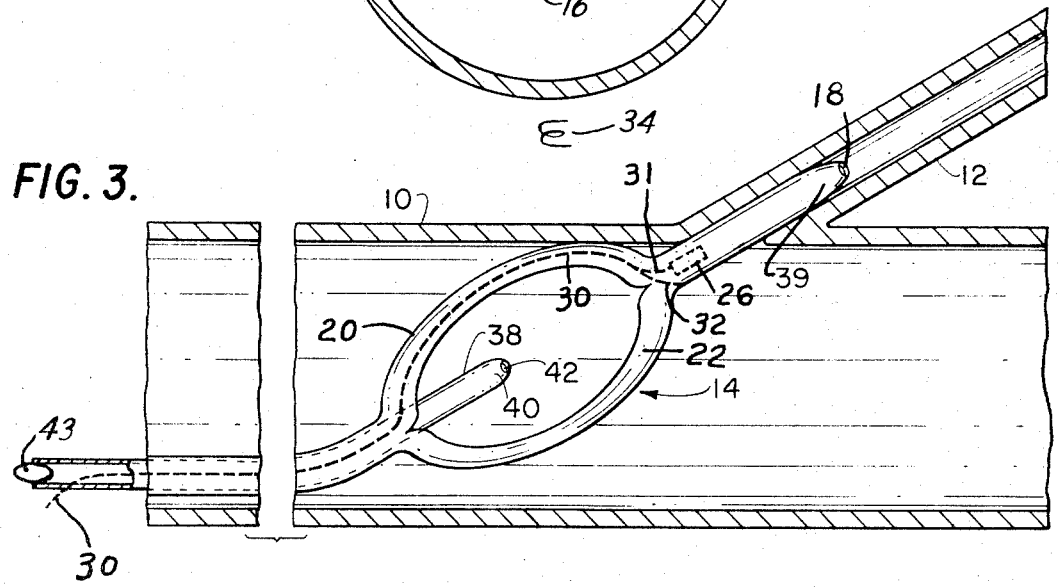
INVENTOR.
ALEXANDER KOLIN
BY JESSUP & BEECHER
Warren T. Jessup
ATTORNEYS 3,734,083

ELECTROMAGNETIC CATHETER VELOMETER - FLOW METER

BACKGROUND OF THE INVENTION

The field of this invention relates to catheters and more specifically to a flow meter which produces a magnetic field across the path of a moving fluid so that the fluid is caused to generate a voltage, such voltage being directly proportional to the velocity of the fluid thereby effecting measurement of the fluid velocity.

Catheters can be generally grouped within two catagories. The first catagory of catheters can be referred to as velometers which measure the instantaneous velocity of blood flow at a certain point within the blood vessel. The second type of catheter functions as a true flow meter in that the flow of blood throughout the entire blood vessel cross section contributes to the flow signal. In other words, the second type of catheter automatically determines the volume rate of flow whereas, to calculate the volume rate of flow with the first type of catheter would require knowledge of the artery diameter. The calculations require the assumption of uniformity of the velocity profile of the blood throughout the blood vessel cross section, which is usually the case in pulsating arterial flow. The catheter apparatus of this invention relates to both types of catheters. It functions as a velometer when centered in a large artery, and as a volume flow meter when plugged into a branch.

Although the second type of catheter construction more directly determines the volume rate of flow of blood within a blood vessel, its calibration is effected by the electrical characteristics of the blood vessel wall, and the electrodes must be adjacent to the blood vessel wall. As a result, the electrical conductivity of the blood vessel wall and the electrical properties of the tissues surrounding the blood vessel may affect the catheter readings. Also, the electrical activity of the heart which gives rise to the electrocardiogram may superimpose a signal unrelated to flow, thus falsifying the measurement.

A prior art velometer construction is defined in an article in the "Journal of Applied Physiology," Volume 26, No. 6, June 1969, by Paul D. Stein and William H. Schuette. Both the catheters disclosed herein and in the aforesaid article cause blood to pass through a tubular element, with electrodes being located within the tubular element to effect measurement of the instantaneous velocity of blood flow. By the placing of electrodes within a tubular element, disturbances which may result due to electrocardiograms, blood vessel wall conductivity, and the electrical properties of surrounding tissues are made negligible. As was stated within the aforesaid article, angulation of the catheter in the range of twenty degrees from the axis of flow causes as much as twenty percent change in the velocity of flow recorded by the catheter.

In addition, the present invention provides a plunger which is operable to occlude flow past the sensing element so as to secure a base line. Also, the present inventor allows the magnet to be located exteriorly of the animal or person, thereby greatly magnifying the electrical signal and reducing in size the sensor. However, a small coreless magnet can be incorporated into the sensor, if desired.

For additional background information relating to electromagnetic catheters, reference may be had to pending patent application Ser. No. 874,094, filed Nov. 3, 1969, (now abandoned) Alexander Kolin.

SUMMARY OF THE INVENTION

The catheter construction of this invention provides for the use of a plastic cylindrical section of thin wall tubing. The tubing is open at one end and is longitudinally slit a short longitudinal distance from the open end of the tubing. The resulting arched portions of the tubing adjacent the slits are deflected outwardly resulting in an open oval shaped aperture being formed. Forwardly of the aperture between the aperture and the open end of the tube, a pair of platinum (or other metal) electrodes are secured within the interior wall of the tube substantially diametrically opposite each other. The arched deflected portions of the resilient tube are permanently shaped in the deflected position, so that this section resiliently collapses to pass through a narrow opening and expands toward its permanent shape in a wider tube. To insure maximum flow of blood into the forward end of the tube, a plurality of inlet openings may be formed in the forward end of the tube between the electrodes and the open end of the tube. The catheter can be energized by either an externally located magnet or by an electromagnetic coil secured directly to the tubing. In a modification of the catheter construction, a movable plug may be employed to occlude the flow through the catheter to thereby permit the establishment of a zero reference base line with respect to the patient.

The method of forming the catheter of this invention can be accomplished by the slitting of a plastic tube, deflecting outwardly the arched portions of the tubing adjacent the slit, heating the deflected portions of the tubing resulting in permanent setting thereof, locating of electrodes diametrically opposite one another within the tube forward of the slit, closing off the tube against fluid flow at the far end of the catheter outside the patient or inside the catheter by a plunger, and the placing of additional inlet openings within the tube between the electrodes and the open end of the tube.

Important characteristics of the invention are that fluid flow can be quickly stopped and started by easy external manipulation, and that the catheter remains well centered in the blood vessel at all times.

BRIEF DESCRIPTION OF THE DRAWING

FIG. 1 is a schematic representation of a cross section of a blood vessel depicting the catheter of this invention as it would be inserted through a blood vessel branch into a main blood vessel;

FIG. 2 is a cross sectional view through the tubular element in the area of the electrode showing the employment of a field producing coil secured directly about the tube; and FIG. 3 is a view similar to FIG. 1 but showing the catheter of this invention as it would be applied to measure the volume rate of blood flow from a branch blood vessel into a main blood vessel, or vice versa.

DETAILED DESCRIPTION OF THE SHOWN EMBODIMENT

Referring particularly to the drawing there is shown in FIG. 1 a longitudinal section view of a blood vessel 10 which represents a main passage for blood flow. Blood vessel 10 could comprise either an artery or a vein. A branch blood vessel 12 (FIG. 3) is shown connected to the blood vessel 10 with the branch blood vessel 12 being of substantially smaller diameter than that of vessel 10. Although it is envisioned that the catheter of his invention will be employed upon human beings, a depicted blood vessel structure could not only be that of a human being but that of any animal as well.

Located within the vessel 10 is the catheter structure 14 of this invention. The catheter structure 14 of this invention is to be formed from a cylindrical flexible tubular element 16 having an open end 18. The tubular element 16 may be formed from a standard angiographic teflon, polyurethane, polyethylene or other suitable plastic material. This type of catheter tube is well known in the art and need not be described in detail.

Displaced a short distance from open end 18, the tubular element 16 is longitudinally slit by a pair of opposed slits 19, a predetermined distance, resulting in the formation of semi-cylindrical arched portions 20 and 22. The portions 20 and 22 are physically spread apart resulting in the formation of oval shaped, lateral opening 24 thru the tube. With the portions 20 and 22 located in this position, a change of the properties within portions 20 and 22 is caused to occur, resulting in the setting of the portions 20 and 22 in the deformed position. Heat or other suitable treatment may be applied to portions 20 and 22 sufficiently to result in a change of the composition thereof, causing the portions to assume deflected positions permanently although resiliently. It is to be noted that although portions 20 and 22 are now permanently established, such are to be readily resilient with respect to each other. This resiliency is an inherent quality of the type of plastic material which is employed in the construction of element 16. It is desired that with the catheter structure 14 of this invention located within the blood vessel 10, as shown in FIG. 1, the portions 20 and 22 will be resiliently biased outwardly into contact with the walls of blood vessel 10. Care must be taken so that the biasing force does not cause injury or breaking of the blood vessel. Therefore, the resilient force is quite small so that pushing together of portions 20 and 22 may readily occur in passing of the catheter structure 14 through a smaller branch blood vessel 12 prior to entrance within the main blood vessel 10. However, the resilient force must be sufficient so as to align the catheter structure 14 so the blood flow enters open end 18 in a parallel direction with the axis of the blood vessel 10.

Cemented to the interior wall of the tubular element 16 in the area between the opening 24 and open end 18 are a pair of platinum electrodes 26 and 28. Electrodes 26 and 28 are to be located substantially diametrically opposite each other and must be oriented in the magnetic field so that the line joining such is perpendicular to the magnetic field. It is recommended that a line joining the electrodes 26 and 28 be perpendicular to the plane of the oval shaped opening 24. Fine insulated wire 31 is connected to electrode 26, and a fine insulated wire 32 connected to electrode 28. To effect connection of the insulated wires 31 and 32 to their respective electrodes 26 and 28, the insulation is removed, the wires are soldered to the electrodes, and insulation is then reapplied, so that no short circuiting of the wires could occur. The wires 31 and 32 are then twisted together resulting in the formation of a cable 30. Wire cable 30 is then guided inside arch portion 20 and out through element 16. It is to be understood that the cable 30 may be passed internally of the arch 20 and the element 16 as shown, or may pass externally with respect thereto, or may be formed interiorly of the material construction of the element 16 and the arch 20. The wires 31 and 32 are externally connected to an appropriate electric signal measuring device (not shown). The electric signal which is transmitted through wires 31 and 32 is dependent on the velocity of movement of the blood past the electrodes 26 and 28. A signal results from the reaction of blood flow and an electromagnet 34 or a permanent magnet (not shown) which creates a magnetic flux shown schematically by arrowed line 33. The magnetic field can be generated in the flowing blood by means of a current carrying coil of wire 34 located about element 16 in the region of electrodes 26 and 28. The coil 34 may be constructed as shown in U.S. Pat. No. 3,309,924 Kolin and Wesshaupt. The electric current in the coil 34 generates a magnetic flux 33 across the blood vessel element 16 so that the blood flowing through the tube 16 develops a voltage which is sensed by the electrodes 26 and 28. Although only one turn of coil 34 is shown, the coil may consist of any desired amount of turns. Also, coil 34 may be replaced by two separate coils.

The operation of the catheter 14 of FIG. 1 is as follows: A portion of blood flowing within blood vessel 10 is conducted through the open end 18 past electrodes 26 and 28 and out through either side of opening 24, back into the blood vessel 10. Holes 36 may be formed within element 16 between the electrodes 26 and 28 and the open end 18 to facilitate the entry of blood into the tube 16.

To block the entry of blood into the element 16 in the aft direction from opening 24, a closed tube acting as a plunger 38 can be pushed through the long section of the catheter past the opening 24 into the entry of the final sensing portion near the tip.

In addition to measuring instantaneous blood velocity at a point within a blood vessel, the catheter structure 14 can be employed to measure the volume rate of the blood flow within a branch vessel 12 as shown in FIG. 3 of the drawings. The end of the catheter may be tapered as shown at 39 and inserted into the branch vessel 12. It is to be noted that the holes 36 have been omitted from catheter structure 14 of FIG. 3 of the drawing. The reason for omission of holes 36 is to insure that all the blood entering the branch 12 passes through the flow sensor. As a result, all the blood flow being conducted from the artery 10 into the branch 12 must exit through the open end 18 after passing the electrodes 26 and 28.

One function of the plunger is to prevent the patient from bleeding through the catheter.

Once the catheter structure has been located within the blood vessel, it is necessary to record a zero reference base line upon which the flow signal may be based. The zero reference base line is determined by blocking the flow of blood between the electrodes by means of this plunger 38. In essence, the plunger 38 plugs the catheter, preventing flow of blood therethrough. Plunger 38 is shown having a tapered end 40 having an opening 42 located therein. The tapered end 40 of plunger 38 is to cooperate in a fluid tight manner with the catheter adjacent the electrodes 26 and 28. The plunger 38 is preferably closed at the aft or exterior end thereof by means of a plug 43; however, the plunger may be closed adjacent the fore end thereof if desired. The reason for closing the plunger 38 in the aft direction is that the blood will fill up the interior of plunger 38 to thereby facilitate the taking of blood samples from the aft end of the plunger 38. Saline solution may be injected into the plunger 38, in place of blood, if desired. Also, drugs may be easily inserted into the blood through the aft end of the plunger 38. If drugs are transmitted within the plunger 38, the fluid located therein is to be forcibly moved by means not shown into the main portion of the blood stream. The plunger 38 must be sufficiently rigid adjacent the forward end thereof so as to effect cooperation of the tapered end 40 with the catheter in the area of the electrodes 26 and 28. The remaining portion of the plunger 38 may be formed in a less rigid construction thereby facilitating insertion of the catheter within the blood stream. With the tapered end 40 located in the fore position adjacent electrodes 26 and 28, occluding of the catheter occurs thereby facilitating insertion of the catheter within the blood stream. With the tapered end 40 located in the fore position adjacent electrodes 26 and 28, occluding of the catheter occurs thereby preventing flow of blood through open end 18 past electrodes 26 and 28 and through opening 24 back into the blood vessel 10.

To establish the zero reference base line the plunger 38 is moved into the fore position as previously described after the catheter has been inserted within the blood vessel 10. As a result, flow of blood past electrodes 26 and 28 is prevented while the catheter is located in the same environment. A recording means (not shown) is to record the signal from the electrodes 26 and 28 which then establishes the zero reference base line. Therefore, upon retraction of plunger 38 away from the fore position, the signal will be representative of only the flow characteristics of the blood.

It is to be noted that it is not necessary for the portions 20 and 22, to contact the blood vessel wall. If the catheter structure 14 is located in a blood vessel larger in diameter than the diameter of the catheter structure about portions 20 and 22, the catheter structure 14 will basically float within the blood vessel. However, the portions 20 and 22 will assist in the centering of the structure 14 within the blood vessel, although not in contact with the blood vessel wall. The approximate physical dimensions of the catheter structure 14 are intended to be approximately 3 millimeters in diameter for element 16 and approximately three to four centimeters between the outer extremities of the arched legs 20 and 22.

What is claimed is:

1. Catheter for use in flow measurement comprising:
    a tube adapted to be inserted into a biological flow vessel and to reside substantially longitudinally therein,
    said tube having entrance passage means for admitting biological fluid into said tube from the vessel, and exit passage means spaced longitudinally of said tube from said entrance passage means for exiting body fluid from said tube back into the vessel;
    centering means for maintaining that portion of the tube having said entrance and exit passage means substantially centrally located within the vessel,
    said centering means being formed by a pair of diametrically oppositely disposed arched longitudinal portions of said tube formed from an intermediate longitudinal slit therein and having a resilient outward bias from the longitudinal axis of the tube,
    said slit constituting one of the passage means; and
    detecting means mounted internally of said tube between said entrance and exit passage means for detecting fluid flow in that portion of the tube between said entrance and exit passage means.

2. Catheter in accordance with claim 1 wherein said detecting means comprises a pair of diametrically disposed electrodes adjacent the interior of said tube.

3. In flow sensing equipment, the combination comprising the catheter of claim 1; and means for imposing a magnetic field substantially perpendicular to the axis of said tube and to a line joining said electrodes.

4. Catheter in accordance with claim 1 including additionally a plunger slidably mounted in said tube and insertable longitudinally through one of said passage means into the portion of said tube between said entrance and exit passage means to selectively block the flow of biological fluid past said detecting means.

5. Catheter in accordance with claim 1 wherein said detecting means comprises a pair of diametrically disposed electrodes mounted in the interior of said tube adjacent the inner wall thereof.

6. In flow sensing equipment, the combination comprising the catheter of claim 5; and means for imposing a magnetic field substantially perpendicular to the axis of said tube and to a line joining said electrodes.

7. Catheter for use in flow measurement comprising:
    a tube adapted to be inserted into a biological flow vessel and to reside substantially longitudinally therein;
    said tube having a pair of diametrically disposed, longitudinal outwardly arched portions formed from an intermediate slit in the tube, said intermediate slit constituting first passage means for biological fluid communicating between the interior of said tube and the flow vessel;
    second passage means in said tube spaced longitudinally from said slit; and
    detecting means mounted interiorly of said tube between said first and second passage means for detecting fluid flow in that portion of the tube between said first and second passage means.

8. Catheter in accordance with claim 7 including additionally:
    a plunger slidably mounted in said tube and insertable longitudinally into said portion of said tube between said first and second passage means to selectively block the flow of biological fluid through the tube past said detecting means.

9. Catheter in accordance with claim 7 wherein said detecting means comprises a pair of diametrically disposed electrodes mounted in the interior of said tube adjacent the inner wall thereof.

10. In flowing sensing equipment, the combination comprising the catheter of claim 9; and means for imposing a magnetic field substantially perpendicular to said tube and to a line joining said electrodes.

11. Catheter for use in flow measurement comprising:
    a tube adapted to be inserted into a biological flow vessel and to reside substantially longitudinally therein;
    said tube having a pair of longitudinally spaced passage means;

detecting means mounted interiorly of said tube between said pair of passage means for detecting fluid flow in that portion of said tube between said pair of passage means; and a plunger slidably mounted in said tube and insertable longitudinally into the portion of said tube between said pair of passage means to selectively block the flow of biological fluid through the tube past said detecting means.

12. Catheter in accordance with claim 11 wherein:
said plunger is tubular, and includes means for selectively blocking or permitting the fluid flow through said plunger, whereby fluids may be selectively flowed from or into the flow vessel through said plunger and tube.

* * * * *